June 3, 1952  E. R. THOMPSON  2,599,210
INTERNALLY INSULATION LINED VESSELS
Filed Oct. 11, 1945
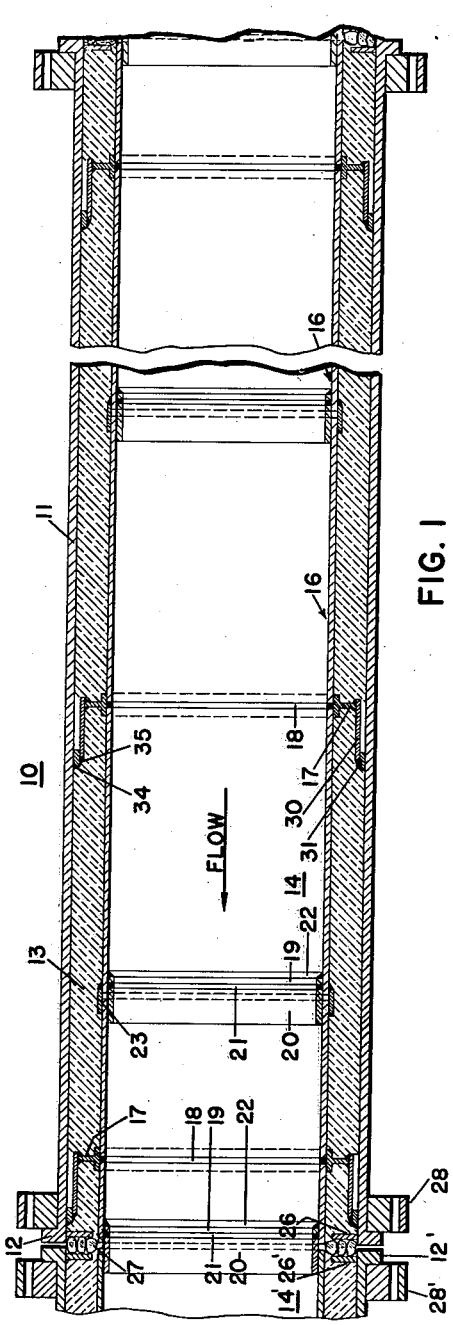
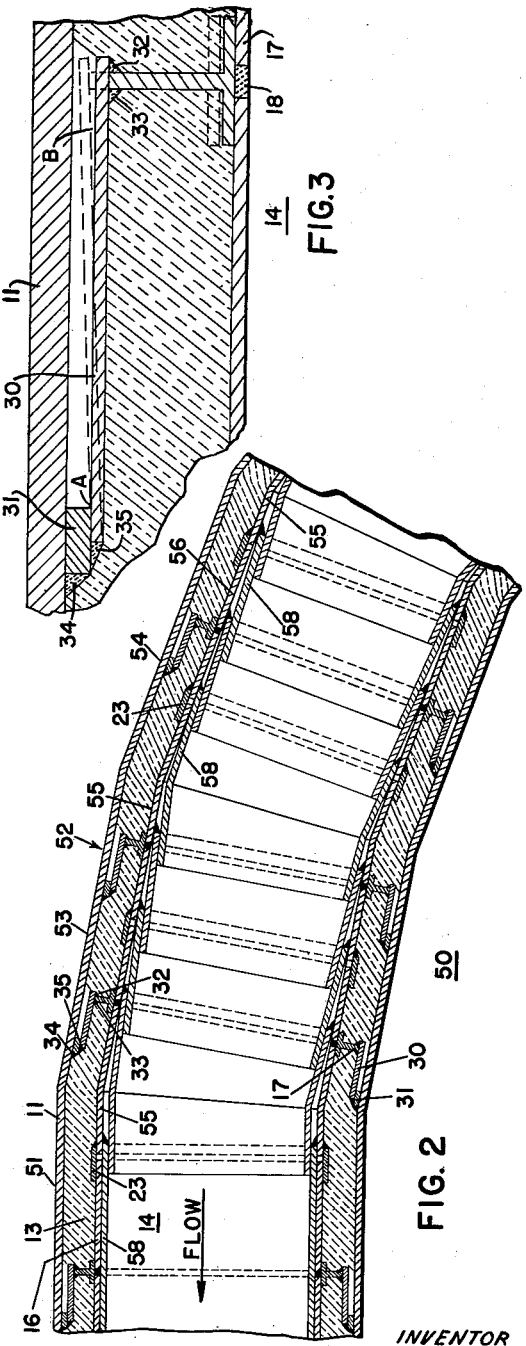
INVENTOR
ELLIOTT R. THOMPSON
BY Virgil F. Darrico
ATTORNEY Patented June 3, 1952

2,599,210

UNITED STATES PATENT OFFICE 2,599,210

INTERNALLY INSULATION LINED VESSEL

Elliott R. Thompson, Merchantville, N. J., assignor to The M. W. Kellogg Company, New York, N. Y., a corporation of Delaware Application October 11, 1945, Serial No. 621,760

12 Claims. (Cl. 138—64)

This invention relates to internally insulated vessels designed to handle materials at high temperatures.

It has become necessary in many arts to provide vessels capable of handling materials at temperatures well above the range in which carbon steel is a satisfactory material of construction. Vessels for this class of service have been made of high creep strength alloys of various analyses. Such alloy vessels have been found satisfactory in many installations but the cost of the alloys, the difficulties attendant their fabrication, the special heat treatments required, and the maintenance and repair problems render such alloy vessels costly and troublesome.

It has been proposed to eliminate the necessity for high creep strength alloys by employing a heat insulating lining against the inner walls of the vessel to reduce their temperature to the range in which carbon steel is fully satisfactory. The insulating linings of this character that have gone into use usually include a depth of insulation which is separated by a comparatively thin metal liner element from the material handled. Since the metal liner element is not designed to withstand the operating pressures, provision is made for pressure equalization throughout the cross-section of the vessel.

Internal insulation linings, in order to properly serve their purpose, must be so constructed and arranged that their insulating value remains unimpaired in service. The chief cause of loss of insulating value in service is the flow of material through the space occupied by the insulation component of the lining. An appreciable flow of the material through the space occupied by the insulation component will raise the temperature of the vessel walls above the range for which they are designed. If the flow is pronounced hot-spots may develop which sometimes approach the temperature of the material handled, also, flow of material through the space occupied by the insulation component may at times remove the insulation itself. These causes may produce a dangerous condition that ultimately results in failure of the vessel.

To prevent flow of the material handled through the space occupied by the insulation component it has been proposed to divide such space into a number of chambers separated from one another by elements impervious to the flow of the material handled. The impervious separating elements are usually united to the vessel walls and to the metal liner elements and support the metal liner elements in position. While these proposals are a step in the right direction they are of little value unless the metal liner element, in any position of use, or under any condition of operation, can expand and contract without substantial restraint; otherwise, it will warp and distort to permit undesired flow of the material handled through the space occupied by the insulation component. Also, it is necessary that the impervious separating elements be of such form and construction that they not only do not offer substantial restraint to the expansion and contraction movements of the metal liner elements but they themselves expand and contract with a minimum of restraint to the end that disruptive stresses are not set up within them that would cause the joints between the impervious separating elements and the vessel walls or the joints between the impervious separating elements and the metal liner elements to fail and, thus, provide passage for substantial flow of the material handled through the space occupied by the insulation component of the liner.

Hot-spots may also appear because of voids in the insulation formed by packing and movement of the insulation through the expansion and contraction of the metal liner elements and their supporting elements. To eliminate, or at least reduce to a minimum, hot-spots that appear through this cause, the arrangement and construction of the metal liner elements and their supporting elements should be such that their expansion and contraction movements have a minimum tendency to move or pack the insulation.

Flow in the space occupied by the insulation may also take place due to failure of the metal liner element by erosion. In straight runs erosion is usually not a serious problem but in runs wherein the direction of flow of the material handled is changed, erosion can be serious, especially if the material handled includes solid particles. It has become accepted practice to protect sections of the insulation lining subject to erosive wear by increasing the thickness of the metal liner element. This expedient is only a partial solution. Erosion does not take place evenly so that even with a thicker metal liner element a great deal of checking and inspection is necessary; also, for the same reason, there is no warning of failure. Welds, especially circumferential welds that project into the flow stream, are especially subject to wear by erosion, and increasing the thickness of the metal liner element in nowise reduces their susceptibility to wear. Furthermore, when failure of the metal liner element occurs, or the metal liner element is worn to the danger point, repair generally involves rebuilding a large section of the insulation lining.

It is a primary object of this invention to provide a novel internal insulation lining for vessels which includes an insulation component separated from the material handled by a metal liner element supported in any angular disposition of the vessel by a continuous, impervious member united to the vessel walls and to the metal liner element to provide an impervious barrier to the flow of the material handled through the space occupied by the insulation component and to permit substantially unrestrained radial and longitudinal expansion and contraction of the metal liner element; the impervious member being such that it expands and contracts with a minimum of restraint and without setting up within it substantial disruptive stresses tending to tear the joints that unite it to the metal liner element and to the vessel walls; the arrangement of the impervious member and metal liner element being such that substantial packing of the insulation component or creation of voids therein does not result by reason of the expansion and contraction of the impervious member and the metal liner element. It is a further important object of the invention to provide in the novel internal insulation lining mentioned, an impervious support member made up majorly of a normally cylindrical support member arranged to expand and contract with a minimum of restraint and so united to the vessel walls and to the liner element that the forces set up in it due to expansion and contraction do not have their effect directly at the joints uniting the impervious support member to the vessel walls and the metal liner element. It is also a major object of the invention to provide in the novel internal insulation lining mentioned a simple erosion protection arrangement which does not materially restrain the radial or longitudinal movement of the metal liner element while it effectively protects the metal liner element and the welded joints therein, the arrangement being such that checking and inspection are reduced to a minimum and a definite warning is given before the metal liner element is attacked, the arrangement, furthermore, being such that it may be readily and cheaply replaced in whole or in part without rebuilding or disturbing the insulation lining.

The further objects, features, and advantages of the invention will be readily apparent from the following description of a present preferred embodiment of the invention taken with the accompanying drawings, in which:

Fig. 1 is a sectional view illustrating the invention as applied to a cylindrical vessel;

Fig. 2 is a view similar to Fig. 1 of a vessel having a bend therein; and

Fig. 3 is an enlarged sectional view of a detail of the invention.

The novel internal insulation lining of the invention is of general application and may be applied to vessels, pipes, conduits, and the like that are used for handling, storing, processing, or flowing solids, gases, vapors or mixtures thereof. By "processing" it is intended to include operations in which combustion takes place directly in vessels, pipes, conduits, and the like. Hereinafter, the term "vessel" will be used to indicate and to include all forms of apparatus to which the novel internal insulation lining may be applied. The novel internal insulation lining may be applied to vessels of any size or shape and is usually formed to conform to the internal shape of the vessel. Since it is more usual to line vessels having a generally circular transverse cross-section, the invention will be described and claimed in connection with such vessels without intention, however, of limiting it to such vessels.

While the vessels to which the novel internal insulation lining of the invention is applied are intended to handle materials at elevated temperatures and usually also at elevated pressures, the invention is not limited to vessels handling high temperature materials as, obviously, the novel lining is useful even at very low temperatures. Thus, the novel internal insulation lining may effectively be used to line vessels handling gases and other materials at temperatures in the range in which carbon steel is not satisfactory because of its low shock resistance, so that by reason of the novel lining the temperature of the vessel walls can be kept above said range.

Vessel 10, shown in Fig. 1 as a straight length of pipe, includes a wall 11 formed with flanges 12 at its ends. Wall 11 is preferably, though not necessarily, made of carbon steel. When made of carbon steel it is usually designed for temperatures not substantially in excess of 650° F. Against wall 11 is disposed insulation material 13. The depth of insulation material 13 employed is such as is necessary to provide the required temperature difference between the material handled and the wall 11 of vessel 10. The material handled, may, for example, be high pressure steam at about 1800° F. In such case, the depth of insulation 13 must be sufficient to provide a heat barrier capable of keeping the temperature of wall 11 at or below the chosen temperature for which walls 11 are designed.

Insulation material 13 may be of any preferred kind and character suited to the service. At present, it is preferred to use insulation material of such kind and in such form that it may be easily applied to the inner surface of the walls of the vessel and shaped to conform to the contour of said surface. An insulation made up of amosite asbestos, diatomaceous earth and a suitable binder has been found satisfactory for the service mentioned above.

Insulation material 13 is separated from the material handled by metal liner element 14 which is made up of a plurality of sections 16. The sections of metal liner element 14 may be made of any metal suitable for the service. If the material handled is non-corrosive, and carbon steel is sufficiently strong at the operating temperature to hold its shape, carbon steel may be used since metal liner element 14 is not designed to withstand the operating pressure. If the material handled is corrosive or carbon steel is not strong enough to keep its shape at the operating temperature, corrosion resisting alloys having superior high temperature creep strength such as chrome steel or chrome-nickel steel, and the like, may be used.

Sections 16 are each formed of two sub-sections, usually equal in length, united to each other and to T-ring 17 by circumferential weld 18. Each of the sub-sections is formed out of one or more sheets of the proper length of metal of the chosen analysis and gage united at their abutting edges by longitudinal welds to form an open-ended cylinder. The subsection forming the downstream end of section 16 has united to its inside face and near the end thereof a narrow buffer ring 19 and a lap ring 20 by means of weld deposits 21 and 22. Buffer ring 19 serves to prevent failure or dislodgement of lap ring 20 by protecting weld 21 from erosive wear which is generally excessive in circumferential welds that project into the flow stream of the material handled. To the outside face of the same sub-section end is united a smaller lap ring 23 by a circumferential weld. The annular groove provided by lap rings 20 and 23 is adapted to fit the upstream end of the next section 16, the ends of the sections being properly spaced to provide for their longitudinal expansion and contraction movements. The expansion joint thus formed also provides a passageway for pressure equalization in the space occupied by insulation 13. Lap rings 20 and 23, aside from performing their joint forming functions, serve to stiffen the ends of the sections against distortion and strengthen them against collapse; these lap rings also serve to maintain the section ends in alignment during their expansion and contraction movements, and, furthermore, prevent direct impingement of the material handled on insulation material 13 as well as aspiration thereof during rapid pressure equalization.

The downstream end of the downstream section 16 terminates adjacent the end of pipe 10 and has united thereto a lap ring 20 and a buffer ring 19. A portion of this lap ring 20 extends into the next vessel 10' and telescopes into the end of metal liner 14' thereof. Weld 21, uniting lap ring 20 to the metal liner element 14, is protected against erosion by a buffer ring 19, united to the metal liner element 14 by circumferential weld 22. This lap ring 20 serves to stiffen the ends of metal liner elements 14 and 14' and strengthens them against collapse while it serves to maintain them in alignment during expansion and contraction. This lap ring 20, furthermore, protects the space between metal liner elements 14 and 14' provided for pressure equalization against direct impingement by the material handled and prevents aspiration of insulation on sudden pressure equalization. Near the ends of vessels 10 and 10' are welded rings 26 and 26' which serve to hold rope insulation 27, or packing insulation in other form, in position when the joint between vessels 10 and 10' is closed by taking up on the bolts, not shown, that pass through the holes in flange rings 28 and 28'.

Each of the T-rings 17, as best shown in Fig. 3, is united to an elongated normally cylindrical member 30. Cylindrical member 30 is united to a ring 31 which, in turn, is united to wall 11 of vessel 10. The transverse web of T-ring 17 is made stiff enough to resist deformation by cylindrical member 30 during expansion and contraction movements. The end of the web of T-ring 17 is positioned sufficiently away from the end of cylindrical member 30 to permit it to be united to cylindrical member 30 by circumferential welds 32 and 33. Ring 31 is united to wall 10 by a circumferential weld 34 deposited on the side of ring 31 away from T-ring 17. A substantial portion of cylindrical member 30 bears on ring 31. The end of the bearing portion of cylindrical member 30 is united to ring 31 by a circumferential weld 35 deposited on the same side of ring 31 as weld 34. Cylindrical member 30 is chosen thin enough to readily flex under the influence of stresses set up therein due to ring 17 and ring 31.

Cylindrical members 30 and T-rings 17 provide impervious barriers to the flow of the material handled through the space occupied by insulation 13 and serve to separate said space into a plurality of bulk-headed compartments from one to another of which the material handled cannot flow. Each of these bulk-headed compartments, however, is provided at or near its middle region with a ring-like passage of controlled size, the passage provided by the expansion joint, through which communication between the central space enclosed by metal liner element 14 and the space occupied by insulation 13 is had for pressure equalization.

The insulation lining may be applied during fabrication of the vessel or immediately thereafter or it may be applied after the vessel is positioned for use. This will generally depend on the size and shape of the vessel. In any event, as much of the insulating lining, or its components, will be fabricated outside of the vessel as is possible.

Assuming that vessel 10 is a large size pipe that affords ready man access, the insulation lining may be applied in a convenient manner by initially positioning all of rings 31 and uniting them to wall 11 by means of welds 34. This permits rings 31 to be accurately positioned as the internal space of vessel 10 is at this time unencumbered with other parts. Cylindrical members 30, previously having had T-rings 17 united thereto, are next positioned and united to rings 31. Flat rings 26 are then positioned and united to the vessel wall 11. Insulation material 13 is next applied to vessel wall 11. Insulation 13 is not positioned in the space between cylindrical member 30 and vessel wall 11. The metal sheets, in the flat form or in a partly or fully shaped condition, necessary to form the upstream and downstream sub-sections of sections 16, are then moved into the vessel and assembled. In this assembly care must be taken to space the ends of the sections to provide sufficient room for expansion. After the sub-sections are complete the proper pairs of sub-sections are united to each other and to their T-rings 17 by depositing welds 18. It is to be noted that the sheets used to form the downstream sub-sections should have lap ring 23, or the component parts thereof, united thereto before such sheets are moved into the vessel 10. It is also preferred to unite buffer rings 19, or the component parts thereof, to the sheets used to form the downstream sub-sections before such sheets are moved into vessel 10. Lap rings 20 and 24 are then moved into position and united to the section ends and to buffer rings 19 by depositing circumferential welds 21.

Rope insulation 27 is positioned prior to closing the joint between vessels 10 and 10' by taking up on the bolts, not shown, that pass through the bolt holes in flange rings 28 and 28'.

In service the heat of the material handled will cause radial and longitudinal expansion of the metal liner element 14. Considering first radial expansion; as liner 14 increases in temperature it will expand in the direction of the walls 11. Since it can be presumed that the whole of the metal liner of any of the sections 16 will attain a substantially uniform temperature, the temperature rise will result in a uniform increase in diameter of the whole of the section 16. Since T-ring 17 is welded directly to its liner section 16, ring 17 will attain a temperature approximating that of the liner section. Thus, T-ring 17 will increase in diameter substantially to the same extent as its liner section 16 and will offer no appreciable restraint to the expansion thereof. Heat will be transmitted from T-ring 17 through cylindrical member 30 to ring 31 and finally to the wall of vessel 10. A substantial temperature drop will take place in the length of cylindrical member 30. Thus, the expansion of cylindrical member 30 will cause it to assume a shape approximating that of a truncated cone, see dotted line position in Fig. 3. The greatest diameter will be found adjacent T-ring 17 and the smallest diameter adjacent ring 31.

As stated, the web of T-ring 17 is made strong and stiff enough to resist deformation by forces set up in cylindrical member 30 while cylindrical member 30 is made flexible enough to deflect or bend under such forces, hence expansion, or restraint in expansion, of cylindrical member 30 will have no appreciable deforming or restraining effect on T-ring 17 nor on the metal of the section 16 of liner 14. Since a temperature drop occurs in the length of cylindrical member 30, T-ring 17 will exert an effect on cylindrical member 30, that is, it will tend to enlarge the diameter of the end region of cylindrical member 30 united to it beyond that to which such region tends to expand to by reason of the temperature rise. This results in deflection line B, shown as point B in Fig. 3, about which cylindrical member 30 will bend or tend to bend towards wall 11.

The opposite end of cylindrical member 30 attains a higher temperature than ring 31. Cylindrical member 30 will thus tend to expand beyond the diameter permitted by ring 31 and wall 10 and bends, or tends to bend, about line A, shown in Fig. 3 as point A. The forces causing or tending to cause the deflections about lines A and B are the only substantial forces set up in cylindrical member 30 by reason of the temperature rise. It is to be noted that the forces mentioned do not act directly on the welds that unite cylindrical member 30 to T-ring 17 and to ring 31 but rather are effective at most to flex the walls of cylindrical member 30. The forces mentioned cannot, therefore, tear the joints if the welds forming the joints are properly designed to carry the weight loads.

The rise in temperature also results in cylindrical member 30 increasing its length but, since cylindrical member 30 does not attain a very high temperature and is comparatively short, the effective increase in length if any, is so small that it imparts no consequential movement to T-ring 17 and the section 16 of liner 14 carried by it. Since the metal of the section 16 is united to its T-ring 17 only by the narrow weld 18, there is no restraint to the longitudinal expansion of the section 16 as the metal of the section 16 can freely expand from weld 18 to its ends. Since weld 18 is located in the middle, or near the middle of the section 16 the movement of any portion of the liner metal is a minimum. Thus, by this construction there is a minimum movement of the parts tending to move or pack insulation 13 and to form voids therein.

Referring now to Fig. 2, vessel 50 is of the same character as vessel 10, above described, and is made up of a straight run 51 and a curved run 52, for convenience only two sections 53 and 54 of the curved run, are shown. Vessel 50 includes the novel insulation lining already described and, in addition, the novel erosion protection arrangement of the invention. The elements of the novel insulation lining have been identified by the same numerals used in Figs. 1 and 3. The construction of the insulation lining is the same but the elements of the lining vary in form where necessary to conform to the shape of the vessel 50 they are associated with.

Metal liner element 14, of vessel 50 of Fig. 2, is made up of sections 16, 55 and 56. Section 16 is found in straight run 51 and is generally the same as section 16 of Fig. 1. Sections 55 are found at the joint between straight run 51 and curved run 52 and at the joints between the sections 53 and 54 of curved run 52. Section 56 is found between the ends of sections 55 in section 54. Whether two sections 55 are used, as in section 53, or a section 56 is interposed between sections 55, as in section 54, will depend on the service. These arrangements are in the nature of alternates.

Sections 16, 55, and 56 have their entire surfaces covered by wear members 58. Wear members 58 are shaped to conform to the shape of the portion of metal liner element 14 they cover. The wear members are arranged in shingle fashion so that they shield all portions of metal liner element 14, including all welds therein, as well as all circumferential welds in wear members 58 themselves, from the stream of the material handled. A wear member 58 is united to each of sections 55 and 56 at the ends thereof to which lap ring 23 is united to form an expansion joint. The wear members 58 have all of the functions of lap rings 20 of the construction of Fig. 1. Wear members 58 are also united to sections 55 and 56 in the region of welds 18. These wear members 58 extend somewhat upstream from welds 18 so as to cover them.

It is to be noted that wear members 58 are so supported that they can freely expand and contract without appreciably restraining or being restrained by the sections of metal liner element 14 to which they are united and without putting loads on rings 17 tending to warp or distort metal liner element 14.

I claim:

1. A vessel, an insulation lining positioned adjacent the inner face of the walls of said vessel, said lining including a depth of insulation and a metal liner element between said insulation and the material handled in the central space of said vessel, and impervious means supporting said metal liner element while permitting substantially unrestrained radial and longitudinal expansion and contraction thereof, said impervious means including a member encircling said metal liner element and united thereto and extending into the space between said metal liner element and the walls of said vessel in a plane transverse to the longitudinal axis of said metal liner element, said encircling member expanding and contracting radially with said metal liner element without substantial restraint to said liner element, and a second member encircling the extending end of said first encircling member and having one end united thereto, said second member being in the shape of a surface of revolution and having its other end united to the walls of said vessel.

2. A vessel, an insulation lining positioned adjacent the inner face of the walls of said vessel, said lining including a depth of insulation and a metal liner element between said insulation and the material handled in the central space of the vessel, and impervious means united to said metal liner element and to the vessel walls supporting said metal liner element while permitting substantially unrestrained radial and longitudinal expansion and contraction thereof, said impervious means including a ring of T cross-section encircling said metal liner element and united thereto, the web of said ring extending into the space between said metal liner element and the walls of said vessel in a plane transverse to the longitudinal axis of said metal liner element, a substantially cylindrical member encircling said web with one end adjacent said web and united thereto, and means uniting the other end of said cylindrical member to the vessel walls, said web being of sufficient strength to resist restraint by said cylindrical member during expansion and contraction.

3. A vessel, an insulation lining positioned adjacent the inner face of the walls of said vessel, said lining including a depth of insulation, a metal liner element between said insulation and the central space of said vessel, and impervious means united to said metal liner element and to the walls of said vessel supporting said metal liner element while permitting substantially unrestrained radial and longitudinal expansion thereof, said impervious means including an elongated member in the shape of a straight-sided surface of revolution, means uniting one end of said elongated member to said metal liner element, and means uniting the other end of said elongated member to the walls of said vessel, said means for uniting said other end including a ring member united to the walls of said vessel upon which said elongated member extends to provide a substantial bearing surface for said elongated member on said ring member, said other end of said elongated member being united to said ring member whereby as said elongated member and said ring member expand any stresses set up will force said elongated member against said ring member and will tend to cause said elongated member to flex in a region proximate said bearing surface.

4. A vessel, an insulation lining positioned adjacent the inner face of the walls of said vessel, said lining including a depth of insulation, a metal liner element between said insulation and the central space of said vessel, and impervious means united to said metal liner element and to the walls of said vessel supporting said metal liner element while permitting substantially unrestrained radial and longitudinal expansion thereof, and impervious means including an elongated cylindrical member normally disposed substantially parallel to said metal liner element, means uniting one end of said cylindrical member to said metal liner element, and means uniting the other end of said cylindrical member to the walls of said vessel, said means for uniting said other end including a ring member united to the walls of said vessel, said cylindrical member extending on the inner face of said ring member, said cylindrical member being united to said ring member along the end of said extending portion, whereby as said cylindrical member and said ring member expand stresses set up in said cylindrical member tend to force said cylindrical member against said ring member and tend to cause said cylindrical member to flex in a region adjacent said ring member.

5. A vessel, a depth of insulation disposed between the walls of said vessel and the central space thereof, a metal liner element formed of a plurality of separate sections separating said insulation from said central space, means supporting each of said sections independently while permitting substantially unrestrained expansion and contraction thereof, and wear protection means covering adjacent sections of said metal liner element sections, said wear protection means being arranged to overlap in shingle fashion to provide continuous wear protection over the whole area of said metal liner elements covered by said wear protection means.

6. A vessel, a depth of insulation disposed between the walls of said vessel and the central space thereof, a metal liner element formed of a plurality of separate sections separating said insulation from said central space, separate means encircling said sections and united thereto, said separate means supporting each of said sections independently while permitting substantially unrestrained expansion and contraction thereof, and wear members covering the joints uniting said sections to their respective supporting means, said wear members arranged in shingle fashion to provide continuous protection over the whole area of said metal liner elements covered by said wear members, each of said wear members being shaped to conform to the shape of the portion of said liner element covered thereby.

7. A vessel, a depth of insulation disposed between the walls of said vessel and the central space thereof, a metal liner element formed of a plurality of separate sections separating said insulation from said central space, means supporting said sections while permitting substantially unrestrained expansion and contraction thereof, adjacent ends of said sections being spaced to provide access into the space occupied by said insulation for pressure equalization, and wear members arranged in shingle fashion covering adjacent ones of said sections and shaped to conform to the shape of said sections covered, each of said sections covered having united to the downstream end thereof one of said wear members positioned to cover said access space thereat, said ones of said wear members serving to guide said adjacent ends of said sections in their expansion and contraction movements.

8. A vessel, a depth of insulation disposed between the walls of said vessel and the central space thereof, a metal liner element formed of a plurality of separate sections between said insulation and the central space of said vessel, means united to said sections supporting each of said sections while permitting substantially unrestrained expansion and contraction thereof, adjacent ends of said sections being spaced to provide access into the space occupied by said insulation for pressure equalization, and wear members arranged in shingle fashion covering adjacent ones of said sections and shaped to conform to the shape of said sections covered, each of said sections covered having united to the downstream end thereof one of said wear members positioned to cover said access space and to guide said adjacent ends in their expansion and contraction movements, each of said sections covered having united thereto at the region of its joint with said supporting means another one of said wear members positioned to cover its said joint.

9. A vessel having a metal wall adapted to confine a flowing stream of material, a metal member positioned on said wall and projecting into said stream, a deposit of weld metal at the upstream end of said metal member uniting said metal member to said wall, and a metal wear member positioned on said wall against the upstream side of said weld metal and united to said wall, said metal wear member projecting into said stream to shield said weld metal from direct impingement by the material of said stream.

10. A vessel having a metal wall adapted to confine a flowing stream of material, a metal member positioned on said wall and projecting into said stream, a metal wear member positioned on said wall and spaced from the upstream end of said metal member, and a deposit of weld metal in the space between said metal members and said metal wear member uniting them to each other and to said wall, said metal wear member protecting said deposit of weld metal from direct impingement by the material of said stream.

11. A vessel, a depth of insulation disposed between the walls of said vessel and the central space thereof, a metal liner element formed by a plurality of separate sections separating said insulation from said central space, adjacent ends of said sections being spaced to provide access into the space occupied by said insulation for pressure equalization, lap rings positioned to cover said access spaces and serving to guide said adjacent ends of said sections in their expansion and contraction movements, a plurality of wear rings, each of said lap rings having one of said wear rings positioned adjacent the upstream end thereof, and a deposit of weld metal between the lap ring and wear ring of each set of lap rings and wear rings uniting its respective lap ring and wear ring to each other and to the metal liner element, said wear rings each protecting their respective deposit of weld metal from direct impingement by the material handled.

12. An insulation lining, adapted to be positioned adjacent to the inner face of the walls of a vessel, comprising a depth of insulation, a metal liner element positioned against said insulation and adapted to confine the material handled to the central space of said vessel, and support means including an elongated cylindrical member and a T-shaped ring member, said T-shaped ring member surrounding said metal liner element, said cylindrical member surrounding said T-shaped ring member, said T-shaped ring member being united to said metal liner element on a narrow peripheral band disposed in a plane transverse to the longitudinal axis of said liner element and located adjacent to the middle of said metal liner element whereby longitudinal expansion and contraction of said metal liner element is unrestrained by said T-shaped ring member, said T-shaped ring member having its central web united to said cylindrical member, and a second ring member united to said cylindrical member and to said vessel walls to provide a bearing surface for said cylindrical member whereby upon expansion said ring members tend to cause said cylindrical member to flex.

ELLIOTT R. THOMPSON.

REFERENCES CITED

The following references are of record in the file of this patent:

UNITED STATES PATENTS

| Number | Name | Date |
|---|---|---|
| 594,449 | Weber | Nov. 30, 1897 |
| 663,570 | Haviland et al. | Dec. 11, 1900 |
| 2,254,964 | Kettlewell | Sept. 2, 1941 |
| 2,419,278 | Motsenbocker | Apr. 22, 1947 |
| 2,451,146 | Baker et al. | Oct. 12, 1948 |